United States Patent
Breau et al.

(10) Patent No.: US 7,694,034 B1
(45) Date of Patent: Apr. 6, 2010

(54) DATA FLOW MANAGER FOR DEVICE MOBILITY

(75) Inventors: Jeremy Breau, Kansas City, MO (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 206 days.

(21) Appl. No.: 11/620,959

(22) Filed: Jan. 8, 2007

(51) Int. Cl.
*G06F 3/00* (2006.01)
*G06F 13/00* (2006.01)
*G06F 5/00* (2006.01)
*H04N 7/173* (2006.01)
*H04N 7/16* (2006.01)

(52) U.S. Cl. ............... 710/16; 710/33; 710/52; 725/86; 725/135

(58) Field of Classification Search ............ 710/16
See application file for complete search history.

(56) References Cited

U.S. PATENT DOCUMENTS

| | | | |
|---|---|---|---|
| 2004/0133914 A1* | 7/2004 | Smith et al. | 725/86 |
| 2007/0094490 A1* | 4/2007 | Lohr | 713/153 |
| 2008/0092178 A1* | 4/2008 | McNamara et al. | 725/62 |

* cited by examiner

*Primary Examiner*—Alford W Kindred
*Assistant Examiner*—Zachary K Huson

(57) ABSTRACT

A system and method for transferring data flows, such as streaming video or audio signals, between end devices that are members of the same end device group is provided. A network examining module identifies end devices having an active data flow. A data session populating module populates a data store for an end device group identifying end devices having active data flows. A managing module determines which end devices are compatible for a data flow to be transferred. The data flow transferring module transfers the active data flow from one group member end device to another group member end device.

17 Claims, 7 Drawing Sheets

DATA FLOW MANAGER FOR DEVICE MOBILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Networks have employed various methods of transferring data stores from user devices in the management of streaming data flows. In particular, voice over internet protocol (VoIP) technology allows users to transfer a voice data stream from a user end device to a target device. In one such application, users are able to bring a voice call from a land line to a mobile phone line. VoIP technology typically transfers a voice data stream by first requiring the target device to be configured to dial into a network profile, and second by causing the network profile to look for the registered user end device where the desired voice data stream resides. Upon connecting to the user end device, the voice data stream is moved to the target device and the communication line is severed at the network profile.

The VoIP technology, as it relates to a network profile, can facilitate a transfer of a voice data stream by connecting user end devices. However, the present method is an ad hoc solution to the problem of providing a multi-directional exchange of streaming data flows between user end devices. In addition, establishing a direct connection between user end devices precludes the movement of streaming data flows between a variety of user end devices. Furthermore, the VoIP technology limits the streaming data flows to streaming audio signals.

In alternative streaming data infrastructures, streaming video signals may be received on a mobile handset through an existing cellular infrastructure, but may not be transferred between user devices. As such, exchange between user devices of streaming data flows has been limited to streaming audio signals and to user end devices that must be pre-configured with a corresponding network profile.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one embodiment, a method for transferring a streaming video signal from a second end device to a first end device is provided. A request is received from a first end device to transfer the streaming video signal of a second end device to the first end device. It is determined whether the first end device and second end device are compatible. The steaming video signal is transferred from the second end device to the first end device if the first and second end devices are compatible.

In another embodiment, a method for transferring a streaming video signal from a first end device to a second end device is provided. A request is received from a first end device to transfer the streaming video signal of the first end device to a second end device. It is determined whether the first end device and second end device are compatible. The steaming video signal is transferred from the first end device to the second end device if the first and second end devices are compatible.

In yet another embodiment, a computer system for transferring the active data flow of a requesting end device to a selected end device is provided. The system comprises a network examining module, a data store populating module, a managing module and a data flow transferring module. The network examining module identifies end devices having an active data flow and the attributes of the data flows. The data session populating module populates a data store for an end device group with the identification of the end devices having active data flows that are members of the end device group and their corresponding data flow attributes. The a managing module receives the request of a requesting end device to display one or more end devices of the requesting end device's end device group having active data flows and accesses the data store for the requesting end device's end device group to determine the one or more of the group member end devices have active data flows. The managing module displays the group member end devices having an active data flow and that are compatible with the requesting end device on the requesting end device. The data transferring module receives a selection of a listed group member end device by the requesting end device and transfers the active data flow from the selected end device to the requesting end device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this specification. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms in order of use in the Specification:

| | |
|---|---|
| SIP | Session Initiation Protocol |
| VoIP | Voice Over Internet Protocol |
| IP | Internet Protocol |
| URI | Uniform Resource Identifier |
| URL | Uniform Resource Locator |

Further, various technical terms are used throughout this description. A definition of such terms can be found in *Newton's Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Exemplary Operating Environment

Having briefly described an overview of embodiments of the present invention, an exemplary operating environment suitable for implementing the present invention is described below.

Figure 1:
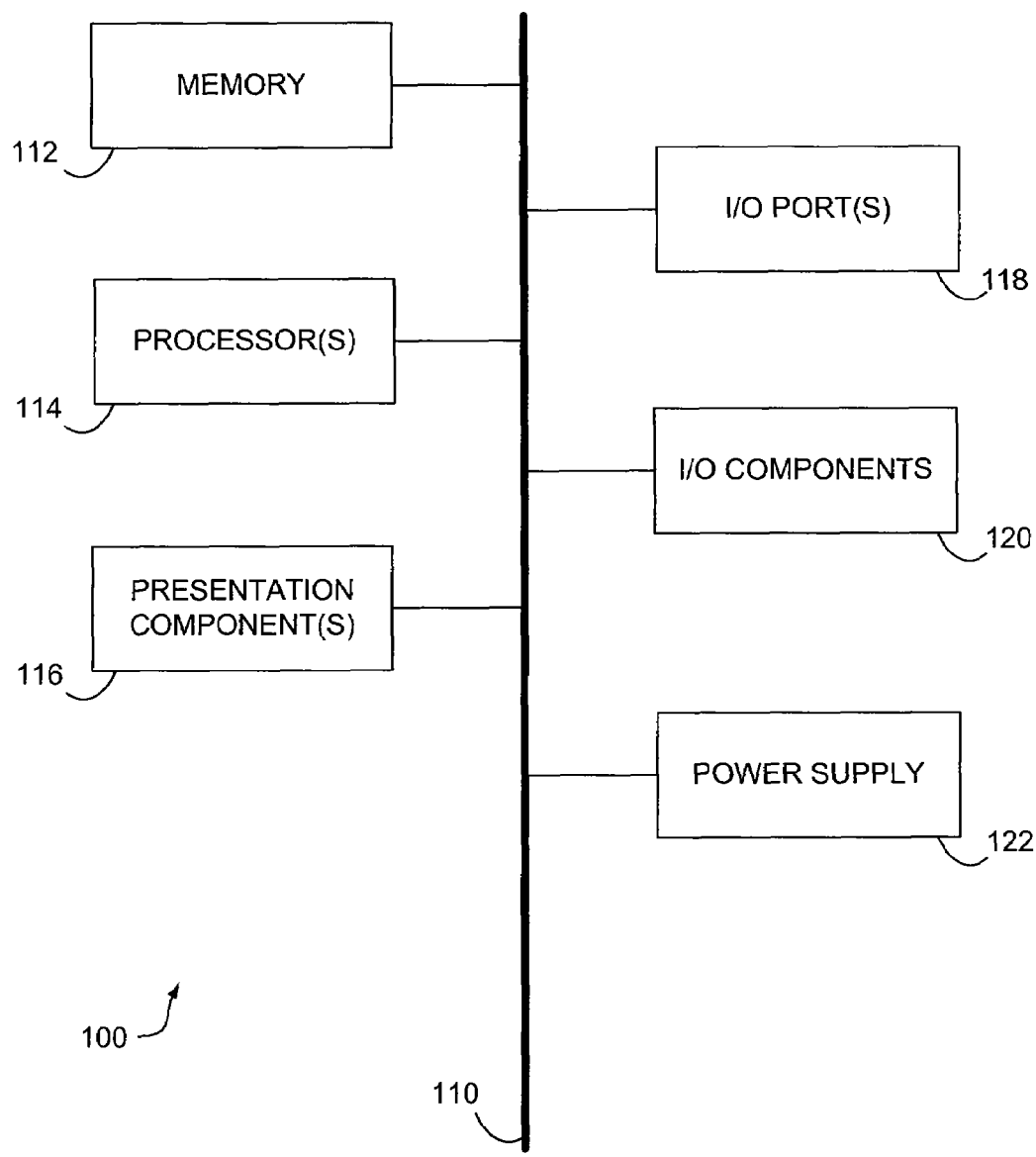
FIG. 1 is a block diagram of an exemplary computing environment suitable for use in implementing the present invention.

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

System Architecture

Figure 2:
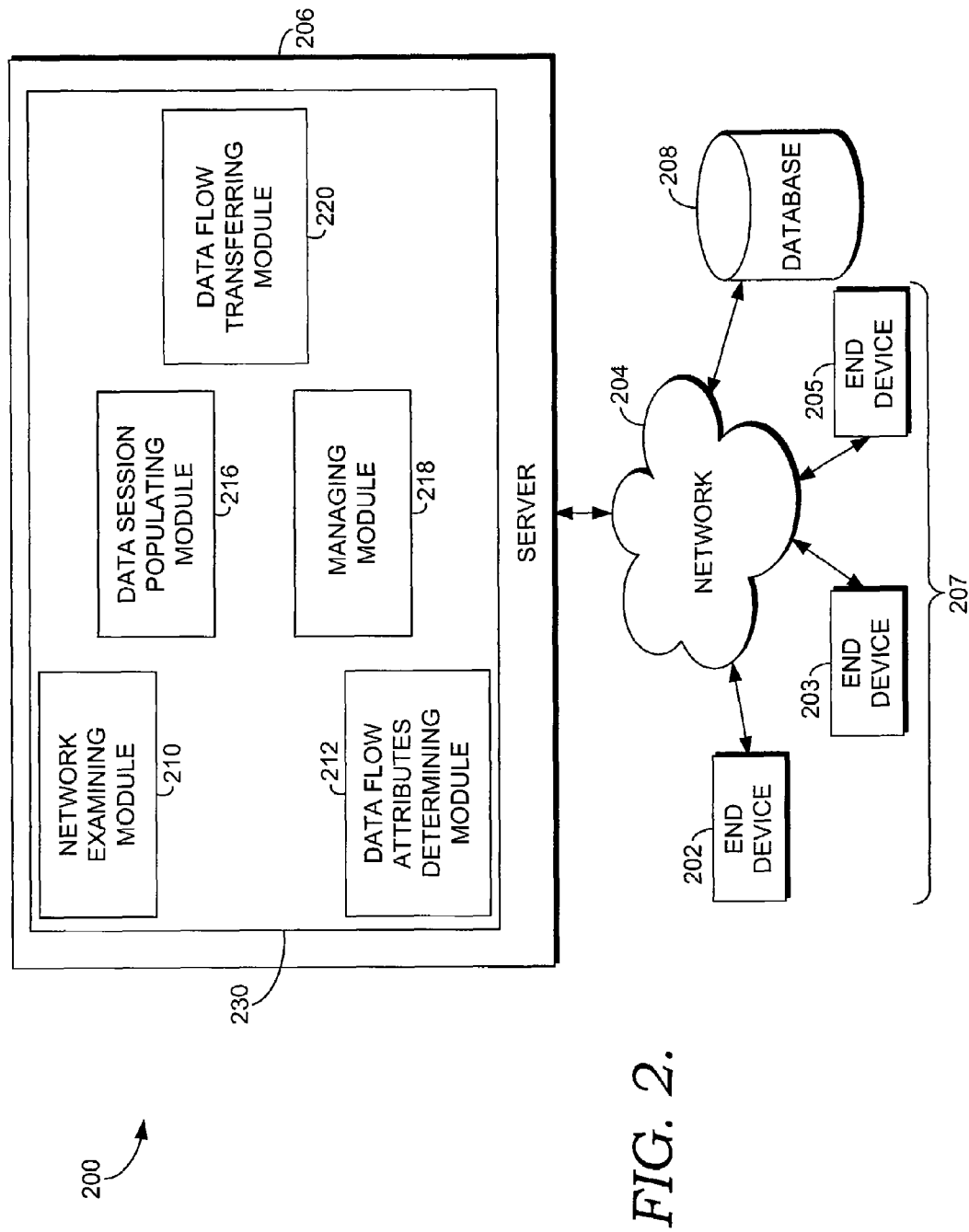
FIG. 2 is a block diagram of an exemplary computing system for examining traffic of one or more data flows on a network in accordance with an embodiment of the invention.

Turning now to FIG. 2, a block diagram is illustrated that shows an overall system architecture 200 for transferring data flows, such as streaming video or audio signals, between end devices 202, 203, 205 in accordance with embodiments of the present invention. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component/module or combination of components/modules illustrated therein.

The end devices 202, 203 and 205 are connected to a server 206 and database 208 via a network 204. The end devices 202, 203 and 204 and the server 206 shown in FIG. 2 may be any type of computing device, such as, for example, computing device 100 described above with reference to FIG. 1. By way of example only and not limitation, the end devices 202, 203 and 205 and/or the server 206 may be a personal computer, desktop computer, laptop computer, mobile handset, consumer electronic device, cell phone, digital video recorder, and the like. It should be noted, however, that the invention is not limited to implementation on such computing devices, but may be implemented on any of a variety of different types of computing devices within the scope of embodiments of the present invention. It will also be appreciated that although the system is depicted as having three (3) end devices, that any number of end devices may be utilized.

A data flow manager 230 includes modules 210, 216, 218, and 220. The modules 210, 216, 218, and 220 comprising the data flow manager 230 and can reside on the server 206 as shown in FIG. 2, or on an end device such as end devices 202, 203, 205. Alternatively, some of the modules 210, 216, 218, and 220 may reside on one or more end devices 202, 203, 205, while others reside on the server 206.

The data flow manager 230 includes a network examining module 210, a data store populating module 216, a managing module 218, and a data transferring module 220. In some embodiments, the modules 210, 216, 218, and 220 may be implemented as stand-alone applications. In other embodiments, the modules 210, 216, 218, and 220 may be integrated directly into the operating system from the server 206. It will be understood by those skilled in the art that the modules 210, 216, 218, and 220 illustrated in FIG. 2 are exemplary in nature and in number and should not be construed as limiting. Any number of modules may be employed to achieve the desired functionality within the scope of embodiments of the present invention.

End devices 202, 203 and 205 may transmit and receive active data flows via network 204. Data flows represent the exchange of information between the end devices 202, 203, 205 or to any other component or module within the overall system architecture 200. Active data flows may be a sequence of digitally encoded coherent signals transmitted by, or sent to, one or more of end devices 202, 203 and 205. In addition, data flows may be transmitted or received via a variety of channels. By way of example only, the routing of a voice conversation over the network 204 as a voice over internet protocol (VoIP) may be transmitted to one or more of end devices 202, 203 and 205 via a cellular infrastructure, such as Sprint TVSM. Alternatively, a TV program may be transmitted to one or more of end devices 202, 203 and 205 by way of cellular unicast, satellite broadcast, and the like. It will be understood and appreciated by those of ordinary skill in the art that methods for transmitting and receiving data flows are not limited to the embodiments described herein.

End devices 202, 203 and 205 may be part of a designated end device group 207. The end device group may include one or more end devices. The designated end device group is includes end devices that one or more users have selected to be part of a particular grouping. For example, an end device group may include a user's cell phone 202, home digital video recorder 203 and personal home computer 205. The description and identification of the end device and the end device group for the end device are typically installed at the time of manufacturing or programming of the end device. By way of example only, a user may purchase a new cell phone that he desires to add to the user's preexisting end device group.

The user has indicated that end devices 202, 203 and 205 are within the end device group 207 and given "permission" to transfer active data flow(s) to all other end devices within that end device group. Thus, end devices 202, 203 and 205 may transfer data flows to other end devices in the end device group. For example, a user of an end device 202 (a cell phone) may transfer the active data flow (a streaming video signal) of end device 202 to end device 203 (a digital video recorder in the user's home), as end devices 202 and 203 are members of same end device group. The transfer of the active data flow from end device 202 to end device 203 is facilitated by the data flow manager 230 comprised of modules 210, 216, 218, and 220.

The network examining module 210 is configured to examine active data flows of end devices, such as end devices 202, 203 and 205. The network examining module 210 passively listens for data flows within an infrastructure of the network 204 and waits for at least one of the end devices 202, 203 or 205 to begin streaming data via the network 204. When the network examining module 210 encounters an active data flow for an end device, the network examining module 210 analyzes the active data flow of the end device and determines the attributes of the data flow.

In one embodiment, the active data flow is a streaming audio and/or video signal. The streaming audio or video signal may carry both content and signal packets. The signal packets may include data flow attributes that are specific to the streaming audio or video signal. For example, the attributes of the streaming audio or video signal may include one or more end device identifiers, end device group data identifying the end device group the end device is a member, timecoded data, which may include the beginning and end time of the data flow of the end device and the length of the data flow, and identification of the streaming signal parameter the data flow, such as a streaming audio signal or a streaming video signal, such as video stream codec. In one embodiment, the streaming signal parameters are comprised of the codec. The codec is a representation of the bit rate, type of encoding, and format of the data flow being transferred. It will be understood and appreciated by those of ordinary skill in the art that the types of data flows are not limited to the embodiments described herein and that elements comprised within the data flow attributes, as well as the values applied to the elements of the data flow attributes, may vary accordingly.

In some instances, the data flow will identify the end device group for the end device with the active data flow. For example, the data flow for end device 202 may indicate that end device 202 is a member of end device group 207. Alternatively, if the end device group is not identified in the data flow of the end device, the network examining module 210 can compare the end device identifier determined by the data flow of the member end device with end device identifiers listed for end device groups to determine, the end device group that end device 202. For example, it may be determined that end device 202 is a member of end device group 207, which is comprised of end devices 202, 203 and 205. If it is determined by the network examining module 210 that the end device with the active data flow is a member of an end device group, the network examining module 210 determines if there is an active data store, such as a table of database, for end device group 207 in data store populating module 216.

If there is not an active data store for the end device group 207, the network examining module 210 sends a session-start message to the data store populating module 216. The session-start message is typically embodied in session initiation protocol (SIP), which is an application-layer control protocol for creating, modifying, and terminating data flows with one or more participants. The session-start message is received by the data store populating module 216, which in turn generates an active data store table for the end device group. For example the data store may be a table or database listing the end devices of the end device group 207 that have active data flows. For example, if end device 202 begins receiving a streaming video signal via network 204 and no other end device of end device group 207 currently has an active data flow, then a data store, such as a table or database, listing end device 202 for end device group 207 is opened by the data store populating module 216. Data store populating module 206 lists the end device 202 for the end device group and populates the table with data flow attributes for end device 202, such as the type of signal and timecode data. By way of example only, an exemplary table listing end device 202 and data flow attributes for end device 202 is shown below as Table 1. It will be appreciated that the data store table may reside on the server 206, an end device, in database 208 or a combination thereof.

TABLE 1

| END DEVICE GROUP 207 | |
| --- | --- |
| End Device Identification | Type of Signal |
| End Device 202 | Streaming Video |

If a data flow for a member end device 202, 203 and/or 205 has become active within the overall system architecture 200 and the network examining module 210 determines if there is an active data store opened by data store populating module 216 associated with the end device group 207, the data store populating module 216 lists the end device that has become active and its related data flow attributes in the existing data store table for the end device group. For example, if end device 203 begins an active data flow via network 204 and end device 202 of end device group 207 currently has an active data flow, then end device 203 is listed the data store table for end device group 207 as shown in Table 2 below.

TABLE 2

| END DEVICE GROUP 207 | |
| --- | --- |
| End Device Identification | Type of Signal |
| End Device 202 | Streaming Video |
| End Device 203 | Streaming Video |

Upon indication that a data flow for a member end device 202, 203 and/or 205 has become inactive within the overall system architecture 200, the network examining module 210 sends out an end message to the data store populating module 216. For example if it is determined by network examining module 210 that end device 202 is no longer receiving a streaming video signal, end device 202 is removed from the data store table for end device group 207. If end device 202 is the last end device listed in the data store table for end device group 207, the network examining module 210 sends a session-end message is typically embodied in session initiation protocol (SIP) to data store populating module 216. Consequently, the data store populating module 216 tears down the data store for the associated end device group 207.

Users utilizing end devices 202, 203 and 205 may request to view which end devices of their end device group, such as end device group 207, have an active data flow. A user may utilize a user interface display on the end device, such as menu display on a cell-phone, a Web page on a laptop computer, or TV channel on a set-top-box for a digital video recorder, to make such a request. By way of example, the request may be input by the user, utilizing a keyboard, joystick, trackball, button, touch-screen, or the like. It will be understood and appreciated that a user may utilize any input method to make the request.

The user's request is received by the managing module 218. If the requesting end device has an active data flow (e.g. is receiving a streaming audio or video signal), then the requesting end device is listed in the data store by the data store populating module 216 along with the attributes of the data flow of the requesting end device, including the streaming signal parameters.

Figure 8:
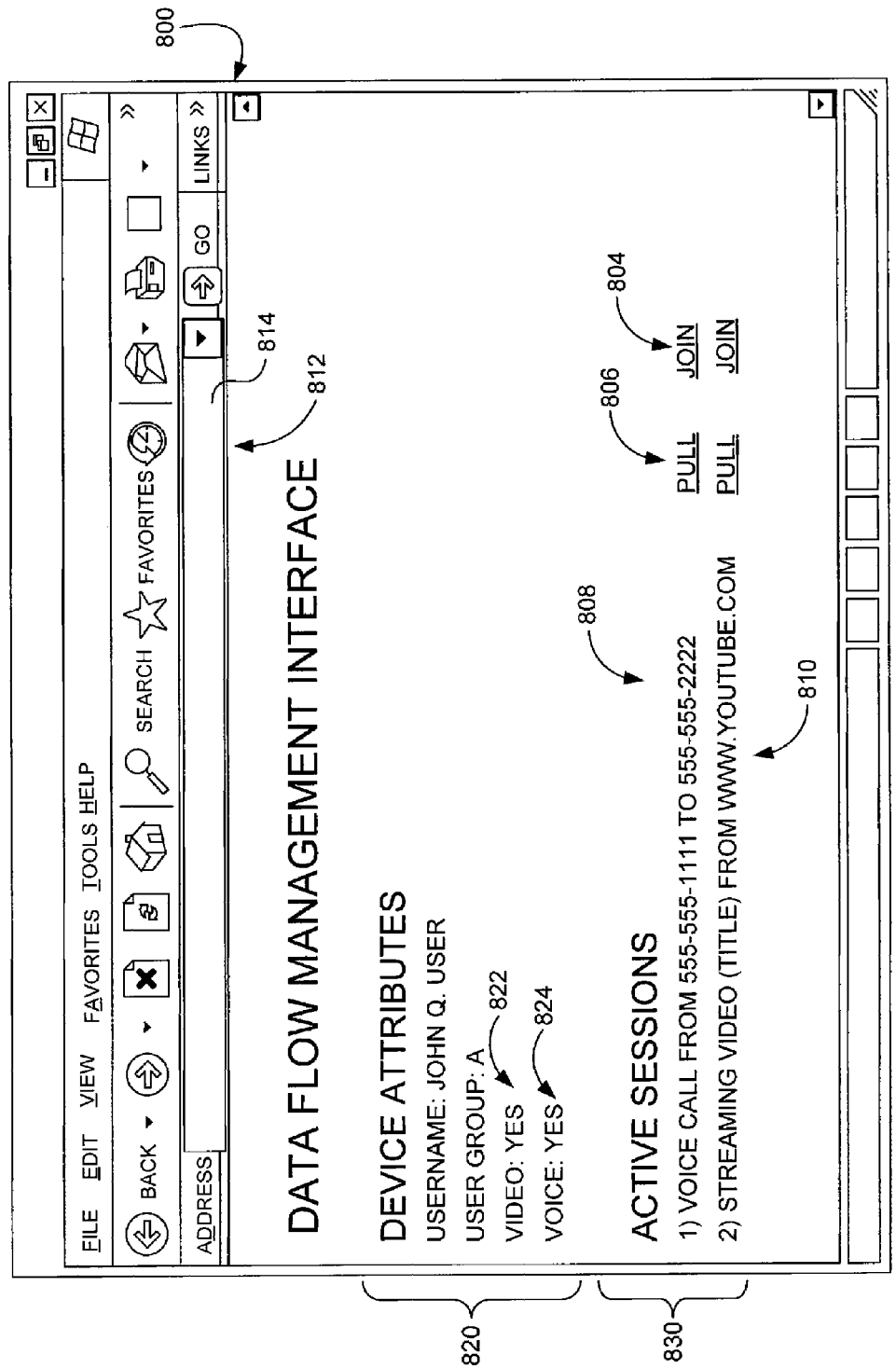
FIG. 8 is an illustrative screen display of an exemplary user interface on a requesting end device for displaying compatible end devices with active flows in accordance with an embodiment of the present invention.

Managing module 218 compares the streaming signal parameters of the requesting end device with the streaming signal parameters of the other end devices in the end device group that have active data flows to determine if the active data flows of the other end devices in the group can be supported by the requesting end device. For example, the managing module 218 will determine if the streaming signal parameter (such as codec) of a data flow from another end device may be sent directly or modified (transcoded) such that the data flow may be interpreted by the requesting end device. By way of example only, the managing module 218 will determine if the streaming video signal of end device 203 of a set-top-box is compatible or is able to be transcoded, by end device 202, a mobile phone with a high-resolution LCD display. In this example, the managing module 218 would determine that end devices 202 and 203 are compatible as both end devices support streaming video signals. As such, end device 203 is displayed on the requesting end device as having a compatible active data flow. An exemplary graphical user interface 800 displaying compatible end devices of an end device group is shown in FIG. 8.

Referring again to FIG. 2, if it is determined by the managing module 218 that the requesting end device and one or more of the end devices with active data flows in the end device group are not compatible, the incompatible end devices are not displayed on the requesting end device or alternatively are displayed but are identified as not being compatible.

If the requesting end device does not have an active data flow (e.g. is not receiving a streaming audio or video signal), then the managing module 216 compares the end device attributes of the requesting end device to the streaming signal parameters stored in the data store table for the end devices of the end device group with active data flows. The end device attributes may be sent from the requesting end device when the request to view compatible end devices with active data flows is received. Alternatively, the end device attributes may be accessed from a database or table.

Typically, the end device attributes identify the end device, e.g., mobile handset, laptop computer, cell phone, set-top-box, the end device group the end device is a member and the signal interpretation capability of the end device. The signal interpretation capability is another end device attribute that corresponds the processing capabilities of the end device. Similar to the streaming signal parameters of the data flow, an assessment of the signal interpretation capability of an end device allows managing module 218, to compare the data flow attributes with the end device attributes. That is, the signal interpretation capability allows the managing module 218 to determine whether the requesting end device is compatible with the active data flows streaming to other end devices in the end device group associated thereto. The determination of compatibility is based upon whether the signal interpretation capability of the requesting end device may accept the data flow format—either sent directly or modified (transcoded)—from another end device with the end device group. If the signal interpretation capability is not compatible with the codec streaming signal parameter of the data flow, then end device is not displayed on the requesting end device or is displayed as being incompatible.

The user's selection is received by the data flow transferring module 220 which is configured to transfer the selected active data flow from the selected end device to the requesting end device. For example, with reference to FIG. 8, a user may select the end device that he or she wants to "pull" or "join" the active data flow, such as a streaming audio or video signal. For example, a user, from end device 205 may select from graphical user interface 800 that they want to "pull" 806 the streaming video signal 810 from www.youtube.com from end device 203. After receiving the selection, the active data flow from the selected end device is transferred to the requesting end device by the data flow transferring module 220. As such, the streaming video signal from end device 203 is transferred to end device 205 and the video that was being viewed on end device 203 is now being viewed on end device 205.

Alternatively, a user, from end device 205 may select from graphical user interface 800 that they want to "join" 804 the streaming audio signal 808 from end device 202. After receiving the selection from the user to join the audio signal from end device 202, the active data flow from the selected end device is replicated on the requesting end device by the data flow transferring module 220. As such, the streaming audio signal from end device 202 is transferred to end device 205 and the audio that was being heard on end device 202 can now be heard on both end device 202 and end device 205.

Figure 3:
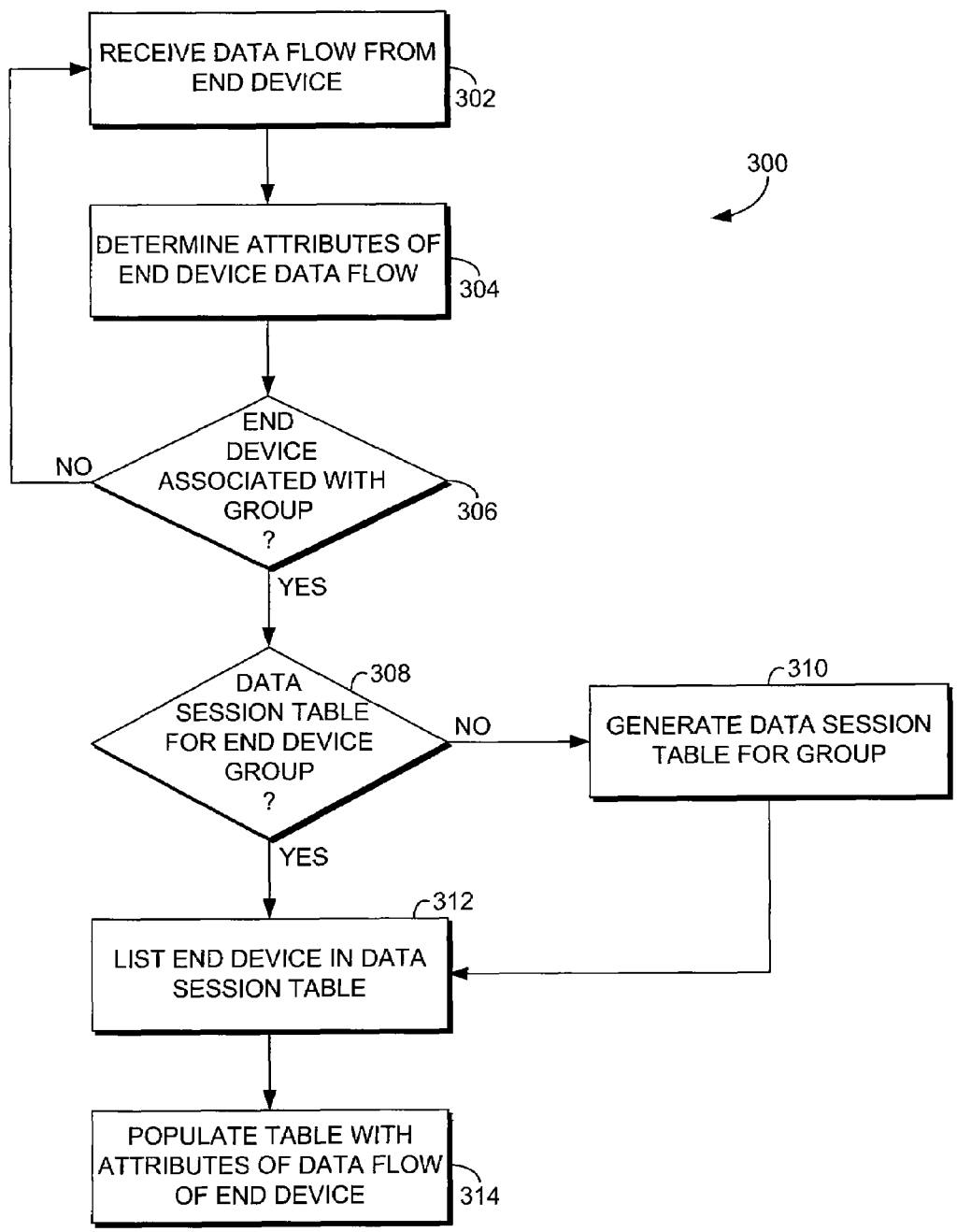
FIG. 3 is a flow diagram depicting a method for generating and populating a data store for an end device group in accordance with an embodiment of the present invention.

With reference to FIG. 3, a method 300 for generating and populating a data store table listing end devices of an end device group with active data flows is shown. At step 302, the network examining module 210 of data flow manager 230 (FIG. 2) receives an active data flow from an end device. As described above, the active data flow may be a streaming audio or video signal. At step 304, the network examining module determines the attributes of data flow of the end device. As described above, attributes of the data flow may include one or more end device identifiers, end device group data identifying the end device group the end device is a member, timecoded data, which may include the beginning and end time of the data flow of the end device and the length of the data flow, and identification of the streaming signal parameter the data flow, such as a streaming audio signal or a streaming video signal, such as video stream codec. At step 306, it is determined whether the end device is associated with an end device group. As shown in FIG. 2, end devices 202, 203 and 205 are members of end device group 207. A user may designate different end devices to be members of the end device group.

The data flow attributes may state the end device group or alternatively may be compared a data store listing end devices for the end device group. If at step 306, it is determined that the end device is not associated with an end device group, the network examining module 210 continues to passively listen for other end devices to begin an active data flow. If at step 306 it is determined that the end device is associated with an end device group, then at step 308 it is determined whether a data store, such as a table or database, has been opened for the end device group. A data store for the end device group may be open if another end device within the end device group has an active flow. For example, when end device 202 of end device group 207 begins an active flow if end device 203 already has an active flow, a data store for end device group 207 is already open. In this instance, end device 202 would be added to the list of end devices of group 207 with active flows at step 312. For example, see Table 2 above.

If at decision step 308 it is determined that a data store is not open for the end device group at step 310 a data store is generated for the group. For example, if it is determined that no other end device for the end device group currently has an active data flow, at step 310 a data store for group 207 is generated. After the data store is opened for the end device group the end device with the active flow is listed in the data store table at step 312. For example, see Table 1, above.

After the end device is listed in the data store table, at step 314 the table is populated with the attributes of the data flow of the end device. The attributes of the data flow may include one or more end device identifiers, end device group data identifying the end device group the end device is a member, timecoded data, which may include the beginning and end time of the data flow of the end device and the length of the data flow, and identification of the streaming signal parameter the data flow, such as a streaming audio signal or a streaming video signal, such as video stream codec. These data flow attributes may be utilized later to determine if a first end device and a second end device are compatible to transfer a data flow, such as a streaming video or audio signal, from one device to the other.

Figure 4:
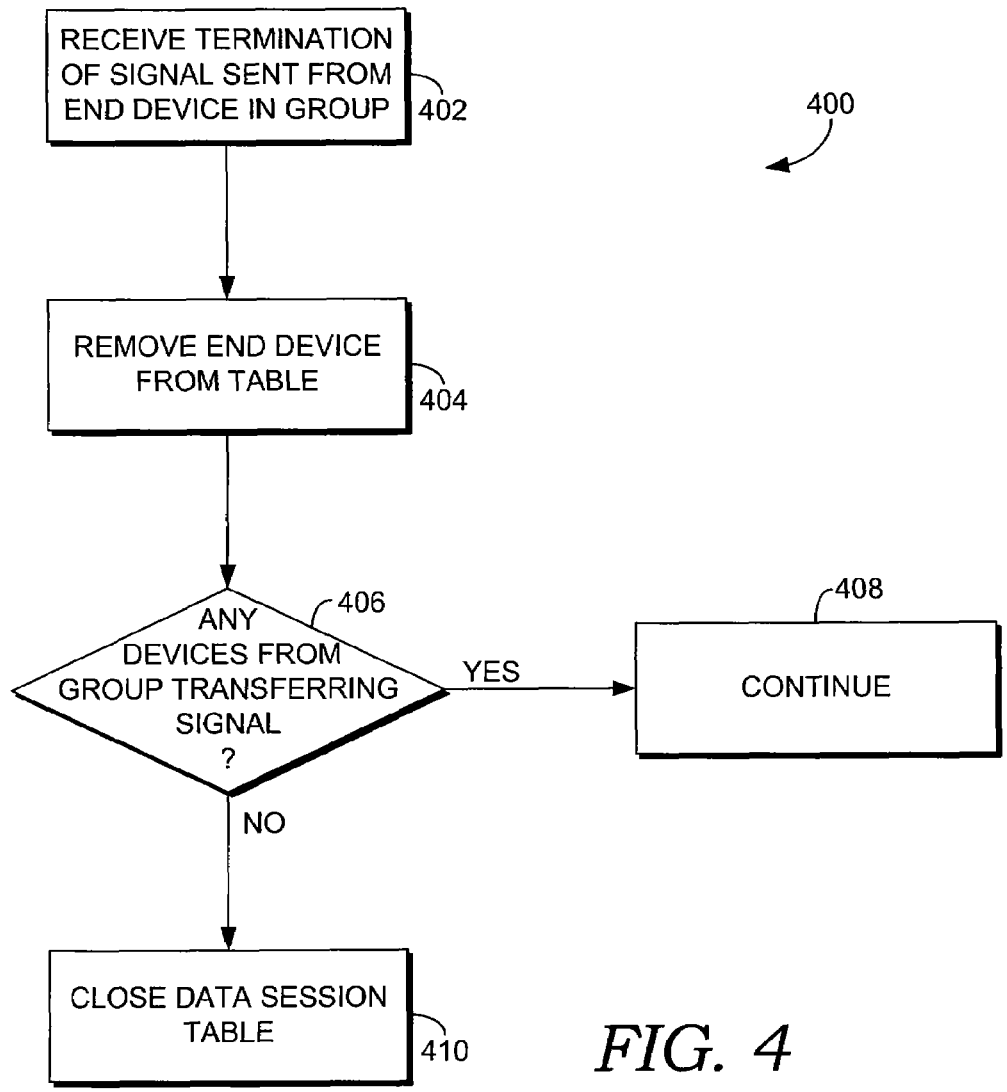
FIG. 4 is a flow diagram depicting a method for closing a data store for an end device group in accordance with an embodiment of the present invention.

Referring next to FIG. 4, at step 402 a termination an active data flow of an end device within an end device group is received. For example, network examining module 210 may no longer be receiving the data flow from an end device and as such notifies data store populating module 216 that the end device no longer has an active data flow. At step 404 the data store populating module 216 removes the end device from the data store for the end device group. For example, if end device 202 is no longer receiving a streaming video signal, end device 202 is removed from the data store for end device group 207.

At step 406, it is determined whether any end devices from the end device group continue to have an active data flow. If so, the data store populating module 216 is removed from the data store for the end device group and the data store remains. If at step 406 it is determined that no end devices from the end device group have active flows, the data store for the end device group is closed at step 410. For example, if none of end devices 202, 203 and 205 of end device group 207 have active flows, the data store populating module 216 will tear down the data store for end device group 207.

Figure 5:
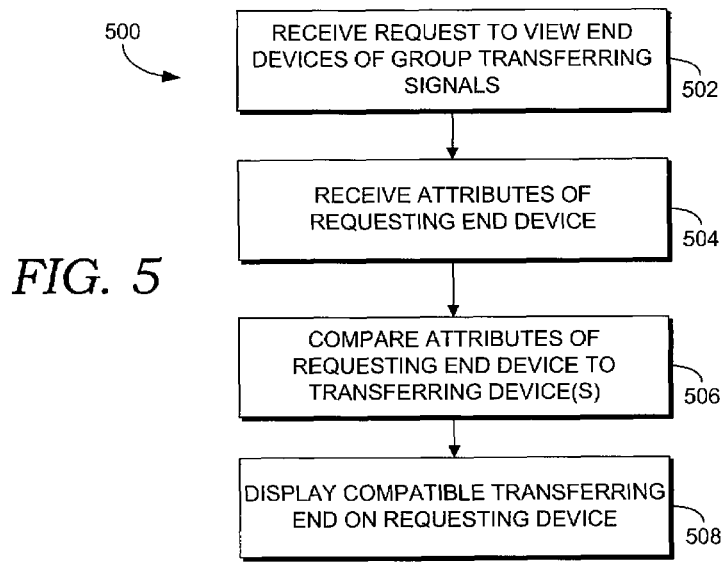
FIG. 5 is a flow diagram depicting a method for displaying compatible end devices with active data flows in accordance with an embodiment of the present invention.

With reference to FIG. 5, a method 500 for displaying compatible end devices with active data flows to a requesting end device is provided. At step 502, a request to view end devices of an end device group with an active data flow is received by data flow transferring module 220 of FIG. 2. For example, a user may input a request via end device 202 to view which end devices have active flows for the user's end device group, such as end device group 207.

At step 503, it is determined whether the requesting end device has an active data flow, such as streaming audio or video. If the requesting end device has an active data flow it will be listed in the data store for the end device group. For example, if the user makes the request from end device 202, a cell phone that is receiving a streaming video signal, than end device 202 is listed in the data store for end device group 207 along with the attributes of the data flow of end device 202. At step 506, the data flow attributes stored in the data store for the end devices listed for the end device group are compared to determine if the requesting device and end devices with active flows are compatible. For example, if requesting end device 202 and end device 203 have active flows, both end devices and the attributes of each device's data flows are listed in the data store. The attributes of the data flow of each device are compared to determine if the two devices are compatible. For example, if both end device 202 and end device 203 have active streaming video signals, they are compatible. As such, at step 508, end device 203 will be displayed as a compatible end device with an active data flow on the requesting end device 202. For example, with reference to FIG. 8, a graphical user interface 800 displaying compatible end devices 830 with active data flows is shown.

If at step 503, it is determined that the requesting device does not have an active data flow, at step 504, the attributes of the requesting end device are received. The attributes of the requesting end device include identification of the end device, e.g., mobile handset, laptop computer, cell phone, set-top-box, identification of the end device group the end device is a member and the signal interpretation capability of the end device.

At step 506, the attributes of the requesting end device are compared to the attributes of the active data flows of end devices within the same end device group to determine if the requesting end device is compatible with the other end devices of the end device group with active data flows. At step 508, compatible end devices with active data flows are displayed as compatible end devices on the requesting end device. For example, with reference to FIG. 8, a graphical user interface 800 displaying compatible end devices 830 with active data flows is shown. The graphical user interface display is displayed on an end device. It will be appreciated that the graphical user interface display 800 may be accessed a variety of ways. In one embodiment, access is achieved by a user selecting a link or button that invokes a uniform resource locator (URL) addressable 814 Web page 812 listing end devices with active data flows 830 for an end device group. The graphical user interface may also list the attributes 820 of the requesting end device including whether the device supports streaming video signals 822 and/or streaming audio signals 824.

Figure 6:
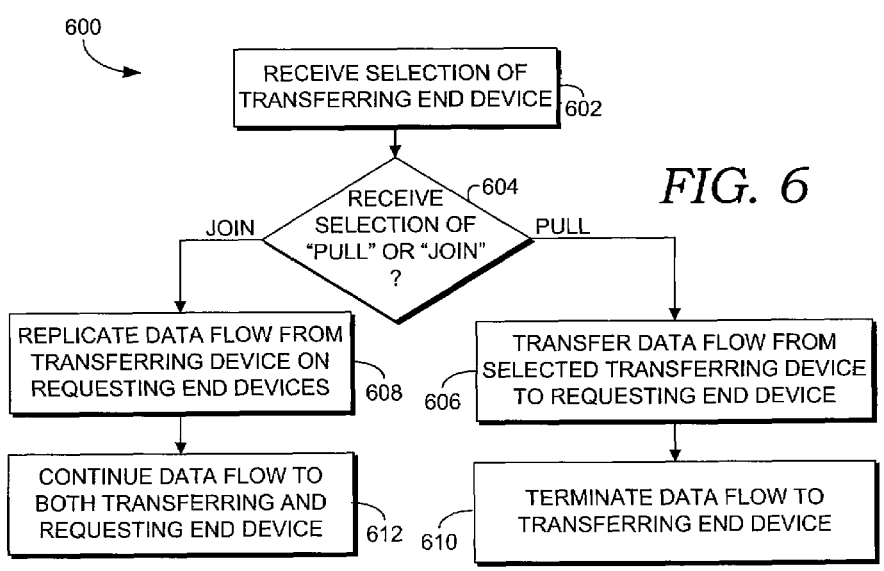
FIG. 6 is a flow diagram depicting a method for transferring or replicating a data flow on a requesting end device in accordance with an embodiment of the present invention.

With reference to FIG. 6, a method 600 for transferring active data flows from one end device to another is shown. At step 602, the selection of an end device with an active flow is received. For example, a user may select one of the compatible end devices with an active flow displayed in graphical user interface. It will be appreciated that the selection of an end device with an active flow may be input in any variety of ways.

At decision step 604, the selection of "pull" or "join" is received. For example, with reference to FIG. 8, a user may select the end device that he or she wants to "pull" or "join" the active data flow, such as a streaming audio or video signal. For example, a user, from end device 205 may select from graphical user interface 800 that they want to "pull" 806 the streaming video signal 810 from www.youtube.com from end device 203. After receiving the selection of "pull" at step 604, the active data flow from the selected end device is transferred to the requesting end device at step 606. As such, the streaming video signal 810 from end device 203 is transferred to end device 205. At step 610, the active data flow to the selected end device is terminated. For example, the streaming video signal being delivered to end device 203 is terminated and is now streaming to end device 205.

Alternatively, a user, from end device 205 may select from graphical user interface 800 that they want to "join" 804 the streaming audio signal 808 from end device 202. After receiving the selection of "join" at step 604, the active data flow from the selected end device is replicated on the requesting end device at step 608. As such, the streaming audio signal 808 from end device 202 replicated on end device 205. At step 612, the active data flow to the selected end device is continues. For example, the streaming audio signal being delivered to end device 202 continues as the streaming audio signal is also send to end device 205.

Figure 7:
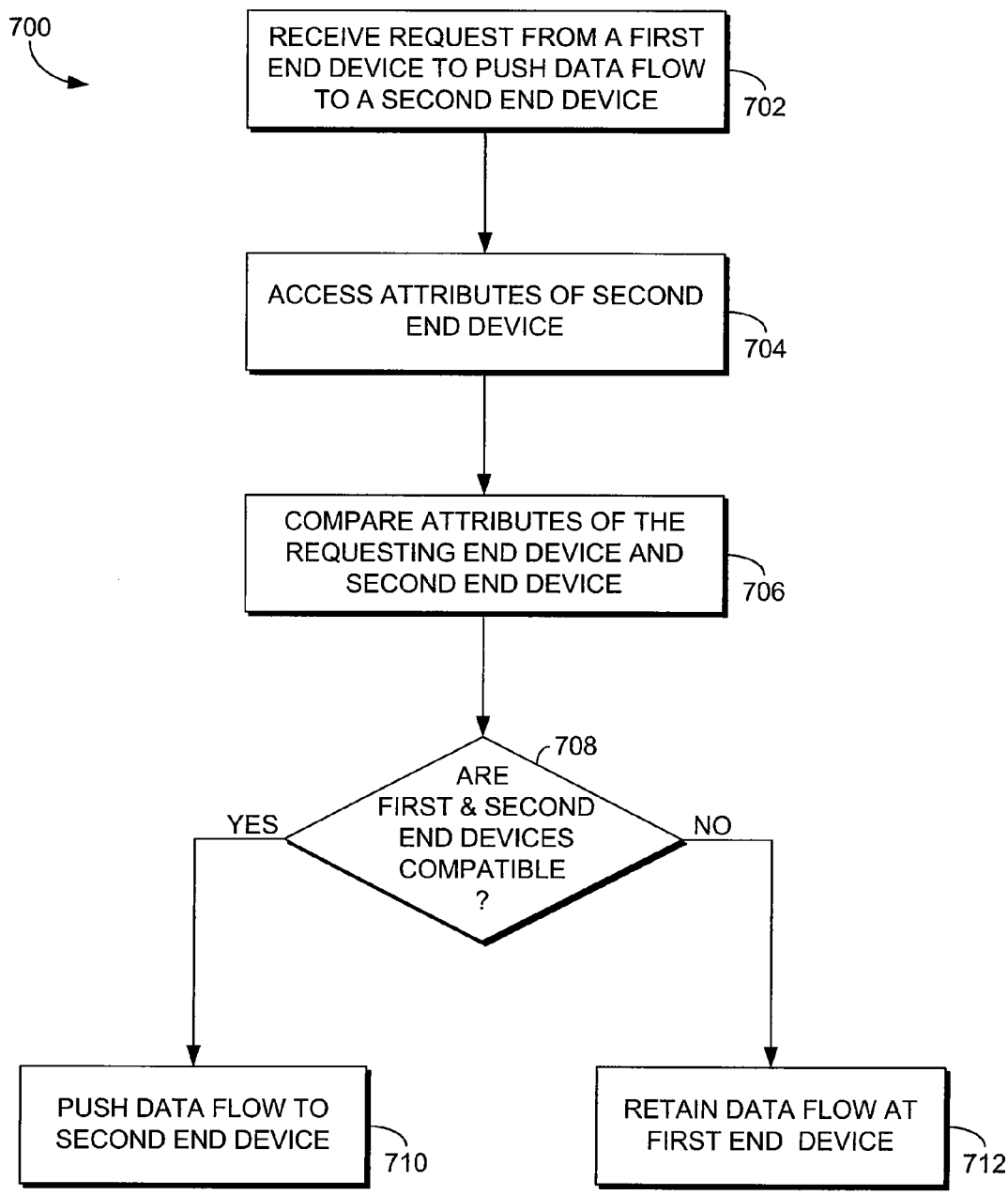
FIG. 7 is a flow diagram depicting a method for transferring a data flow from a first end device to a second end device in accordance with an embodiment of the present invention.

With reference to FIG. 7, a method 700 for transferring a data flow from first end device to a second end device is shown. At step 702, a request is received from a first end device to "push" the active data flow on the first end device to a second end device. As the first end device has an active data flow, the first end device and the attributes of the data flow, such as streaming audio or video signals, are populated into a data store such as a table or database for the end device group of which the first end device is a member.

At step 704, the attributes of the second end device are accessed. The attributes of the second end device may be accessed by requesting the attributes from the second end device or accessing a table or database listing the attributes of the second end device. At step 706, the attributes of the data flow of the first end device and the attributes of the second end device are compared to determine if the devices are compatible at step 708. For example, if the first end device is a television with a streaming video signal and the second end device is a cellular phone, it is determined whether the cellular phone can support the streaming video signal of the television. If the first and second end devices are compatible, the data flow, such as a streaming audio or video signal, is pushed from the first end device to the second end device. For example, the streaming video signal from a user's television may be transferred to the user's cellular phone. If at step 708, it is determined that the first and second devices are not compatible, the data flow, such as the streaming audio or video signal is retained at the first end device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable media having computer-useable instructions embodied thereon for performing a method for transferring a streaming video signal being viewed via a second end device from the second end device to a first end device, the method comprising:
receiving at a data flow manager operating at a computing device, a request from a first end device to transfer a streaming video signal being viewed via a second end device such that the streaming video signal is viewed via the first end device, wherein the first and second end devices are part of a user-designated end device group, and wherein the computing device is separate and distinct from the first end device and the second end device;
determining whether the first end device and second end device are compatible;

transferring the steaming video signal from being viewed via the second end device to being viewed via the first end device if the first and second end devices are compatible, and terminating the streaming of the video signal to the second end device such that the video signal is no longer viewable via the second end device; or continuing the streaming of the video signal to the second end device such that the video signal streams to both the first end device and the second end device substantially simultaneously.

2. The computer-readable media of claim 1, wherein the first and second end devices are one of a cellular phone, a telephone, a home computer, a set-top box, personal data assistant and a digital video recorder.

3. The computer-readable media of claim 1, wherein the streaming video signal is a codec signal.

4. The computer-readable media of claim 1, wherein the first and second end devices are compatible if the first end device can support the streaming video signal of the second end device.

5. One or more tangible computer-readable media having computer-useable instructions embodied thereon for performing a method for transferring a streaming video signal being viewed via a first end device from the first end device to a second end device, the method comprising:

receiving at a data flow manager operating at a computing device, a request from a first end device to transfer a streaming video signal being viewed via the first end device such that the streaming video signal is viewed via a second end device, wherein the first and second end devices are part of a user-designated end device group, and wherein the computing device is separate and distinct from the first end device and the second end device;

determining whether the first end device and second end device are compatible; and when the first and second end devices are compatible, transferring the steaming video signal from being viewed via the first end device to being viewed via the second end device; or continuing the streaming of the video signal to the first end device such that the video signal streams to both the first end device and the second end device substantially simultaneously.

6. The computer-readable media of claim 5, wherein the first and second end devices are one of a cellular phone, a telephone, a home computer, a set-top box, personal data assistant and a digital video recorder.

7. The computer-readable media of claim 5, wherein the streaming video signal is a codec signal.

8. The computer-readable media of claim 5, wherein the first and second end devices are compatible if the second end device can support the streaming video signal of the first end device.

9. One or more tangible computer-readable media having computer-useable instructions embodied thereon for performing a method for transferring a streaming video signal being viewed via a second end device from the second end device to a first end device, the method comprising:

a data flow manager operating at a computing device monitoring a network for one or more active data flows;

the data flow manager identifying an active data flow from a second end device and determining one or more attributes of the active data flow, wherein the active data flow is a streaming video signal;

determining that the second end device is a member of a user-designated end device group;

receiving at the data flow manager, a request from a first end device to transfer the streaming video signal being viewed via the second end device such that the streaming video signal is viewed via the first end device, wherein the first and second end devices are one or more of a cellular phone, a telephone, a home computer, a set-top box, personal data assistant and a digital video recorder, and wherein the first end device is part of the user-designated end device group;

determining whether the first end device and second end device are compatible, wherein the first and second end devices are compatible if the first end device can support the streaming video signal being viewed via the second end device; and transferring the steaming video signal from being viewed via the second end device to being viewed via the first end device if the first and second end devices are compatible, and a) terminating the streaming of the video signal to the second end device such that the streaming video signal is no longer viewable via the second end device, or b) continuing to stream the video signal to the second end device while the streaming video signal is also being sent to the first end device such that the video signal is being viewed via both the first and second end devices, wherein the computing device at which the data flow manager operates is separate and distinct from the first end device and the second end device.

10. The computer-readable media of claim 9, wherein the streaming video signal is a codec signal.

11. The computer-readable media of claim 1, wherein the streaming video signal includes both content packets and signal packets, and wherein a signal packet includes data attributes for the streaming video signal.

12. The computer-readable media of claim 5, wherein the streaming video signal includes both content packets and signal packets, and wherein a signal packet includes data attributes for the streaming video signal.

13. The computer-readable media of claim 9, wherein the streaming video signal includes both content packets and signal packets, and wherein a signal packet includes data attributes for the streaming video signal.

14. The computer-readable media of claim 4, wherein the streaming video signal is transcoded to allow the first end device to support the streaming video signal.

15. The computer-readable media of claim 8, wherein the streaming video signal is transcoded to allow the second end device to support the streaming video signal.

16. The computer-readable media of claim 9, wherein the streaming video signal is transcoded to allow the first end device to support the streaming video signal.

17. The computer-readable media of claim 9, wherein the streaming of the video signal to the second end device is terminated when the request is a "pull" request, and the streaming of the video signal to the second end device is continued when the request is a "join" request.

* * * * *